(12) United States Patent
Shimada et al.

(10) Patent No.: US 8,596,231 B2
(45) Date of Patent: Dec. 3, 2013

(54) ENGINE SYSTEM WITH REFORMER

(75) Inventors: Atsushi Shimada, Hitachinaka (JP); Takao Ishikawa, Hitachi (JP); Tadashi Sano, Ushiku (JP)

(73) Assignee: Hitachi, Ltd., Tokyo (JP)

( * ) Notice: Subject to any disclaimer, the term of this patent is extended or adjusted under 35 U.S.C. 154(b) by 246 days.

(21) Appl. No.: 13/001,826

(22) PCT Filed: Jun. 30, 2009

(86) PCT No.: PCT/JP2009/061992
§ 371 (c)(1),
(2), (4) Date: Mar. 18, 2011

(87) PCT Pub. No.: WO2010/001907
PCT Pub. Date: Jan. 7, 2010

(65) Prior Publication Data
US 2011/0265736 A1  Nov. 3, 2011

(30) Foreign Application Priority Data
Jun. 30, 2008  (JP) ................................. 2008-169780

(51) Int. Cl.
*F02B 75/20* (2006.01)
*F02B 43/00* (2006.01)
*F02B 43/08* (2006.01)

(52) U.S. Cl.
USPC .............................. 123/58.8; 123/1 A; 123/3

(58) Field of Classification Search
USPC .............................. 123/31, 199 E, 58.8, 1 A, 3
See application file for complete search history.

(56) References Cited

U.S. PATENT DOCUMENTS

| | | | | |
|---|---|---|---|---|
| 3,915,125 A * | 10/1975 | Henkel et al. | ...................... | 123/3 |
| 4,003,343 A * | 1/1977 | Lee | .................................. | 123/3 |
| 4,086,877 A * | 5/1978 | Henkel et al. | ................. | 123/1 A |
| 4,131,095 A * | 12/1978 | Ouchi | .......................... | 123/58.8 |
| 4,321,942 A * | 3/1982 | Duggan | ........................ | 137/218 |
| 7,703,445 B2 * | 4/2010 | Haga | ............................... | 123/525 |
| 7,770,545 B2 * | 8/2010 | Morgenstern | ..................... | 123/3 |

(Continued)

FOREIGN PATENT DOCUMENTS

| | | |
|---|---|---|
| JP | 6323211 | 11/1994 |
| JP | 11223122 | 8/1999 |

(Continued)

OTHER PUBLICATIONS

Notice of Reasons for Rejection dispatched from Japan Patent Office, for Japanese Patent Application No. 2011-280689 on Dec. 18, 2012.

*Primary Examiner* — Lindsay Low
*Assistant Examiner* — Charles Brauch
(74) *Attorney, Agent, or Firm* — Antonelli, Terry, Stout & Kraus, LLP.

(57) ABSTRACT

Disclosed is an engine system with a reformer, the engine system comprising a reformer and driving an engine using, as a fuel, a reformed fuel produced by reforming pre-reformed fuel with the reformer, in which the reformer is connected with both a pre-reformed fuel supply adjustment unit which adjusts the amount of the pre-reformed fuel supplied to the reformer and a reformed fuel supply adjustment unit which adjusts the amount of reformed fuel supplied to the engine, and the reformer is installed adjacent to the engine combustion chamber via the reformed fuel supply adjustment unit.

6 Claims, 15 Drawing Sheets

(56) References Cited

U.S. PATENT DOCUMENTS

| | | |
|---|---|---|
| 2001/0054309 A1* | 12/2001 | Ohmori et al. ............... 73/118.1 |
| 2002/0062641 A1* | 5/2002 | Shiino et al. .................... 60/286 |
| 2003/0168024 A1* | 9/2003 | Qian et al. ........................ 123/3 |
| 2005/0081514 A1* | 4/2005 | Nakada ........................... 60/286 |
| 2008/0022983 A1* | 1/2008 | Martindale .................. 123/575 |
| 2008/0081230 A1* | 4/2008 | Takahashi et al. .............. 429/17 |

FOREIGN PATENT DOCUMENTS

| | | |
|---|---|---|
| JP | 2003-074395 | 3/2003 |
| JP | 2007138781 | 6/2007 |
| JP | 2008-169780 | 7/2008 |
| WO | WO 2007/026558 | 3/2007 |
| WO | WO 2007/123669 | 11/2007 |

* cited by examiner

MAP INDICATING EXHAUST GAS TEMPERATURE
(DOWNSTREAM OF EXHAUST PIPE)

MAP INDICATING EXHAUST GAS TEMPERATURE
(UPSTREAM OF EXHAUST PIPE)

ENGINE SYSTEM WITH REFORMER

FIELD OF THE INVENTION

The present invention relates to an engine system with a reformer.

BACKGROUND OF THE INVENTION

In a system in which a fuel is reformed by an endothermic reaction so that a reformed gas including hydrogen, etc. is produced to be supplied to an engine as a fuel, by reforming the fuel in the endothermic reaction using an engine waste heat, a waste heat is recovered, and an improvement in efficiency is expected. Also, when a hydrocarbon fuel, such as gasoline, etc., is reformed so as to supply a reformed gas including hydrogen to the engine, a pumping loss reduction, a combustion efficiency improvement, and a combustion rate improvement are enabled, and an improvement in efficiency of the engine is expected. When the reformer is attached to an exhaust pipe of the engine, an exhaust gas temperature of the engine varies according to an operating status of the engine. Therefore, according to conditions, a reforming efficiency varies. Also, when a gas including hydrogen is produced by a reforming reaction, the lower the reaction pressure, the higher the reaction efficiency.

For example, as described in a patent document 1, a conventional engine system with a reformer has a configuration in which the reformer is attached to an exhaust pipe at a position apart from the engine by a predetermined distance, and a reformed gas produced by the reformer is supplied to a suction pipe together with an exhaust gas.

PRIOR ART DOCUMENTS

Patent Documents

Patent document 1: JP 2007-138781 A

SUMMARY OF THE INVENTION

Problem to be Solved

In the system described in the patent document 1, for example, when the engine is in a low-power operating condition such as an idling condition or a low speed condition, a temperature of the exhaust gas supplied to the reformer is low. Therefore, it is difficult to increase the reforming efficiency. Also, since a reformed fuel is supplied to the suction pipe of the engine together with the exhaust gas of the engine, the reformed fuel is supplied into the engine together with the exhaust gas at normal temperatures. For this reason, there is a problem that a combustion temperature falls at the time of engine combustion, an exhaust gas temperature falls, resulting in a decrease in reforming efficiency.

An object of the present invention is to provide an engine system, in which an amount of recovered waste heat and a combustion efficiency of an engine are improved by improving a reforming efficiency of a reformer, and thereby resulting in an excellent system efficiency.

Means to Solve the Problem

The present invention provides an engine system, comprising: a reformer by which a pre-reformed fuel is reformed to produce a reformed fuel as one of fuels so as to drive an engine; a pre-reformed fuel supply adjustment unit which adjusts a supply amount of the pre-reformed fuel to be supplied to the reformer and is connected to the reformer; and a reformed fuel supply adjustment unit which adjusts a supply amount of the reformed fuel to be supplied to the engine and is connected to the reformer, in which the reformer is installed adjacent to an engine combustion chamber via the reformed fuel supply adjustment unit. Also, the reformer is attached to an exhaust pipe of the engine so that the reformed fuel supply adjustment unit is an exhaust valve of the engine.

By installing the reformer adjacent to the combustion chamber of the engine and supplying the reformed fuel to the engine via the reformed fuel supply adjustment unit, a combustion temperature rises at the time of engine combustion. A temperature of an exhaust gas supplied to the reformer rises, and a recovery efficiency of an exhaust gas energy increases. Also, by supplying the reformed fuel from the reformer to the engine using a negative pressure during a suction stroke of the engine, a pressure in the reformer can be lowered. Further, since the reformed fuel is supplied to the engine together with the exhaust gas at high temperature, lowering of the combustion temperature associated with an increase in supply amount of the reformed fuel is suppressed, resulting in suppression of lowering of the exhaust gas temperature. For this reason, the reforming efficiency of the reformer is improved.

Effect of the Invention

According to the present invention, an engine system, in which an amount of recovered waste heat and a combustion efficiency of an engine are improved by improving a reforming efficiency of a reformer, and thereby resulting in an excellent system efficiency, can be provided.

DESCRIPTION OF PREFERRED EMBODIMENTS

Hereinafter, an embodiment of the present invention will be explained with reference to the accompanying drawings.

Figure 1:
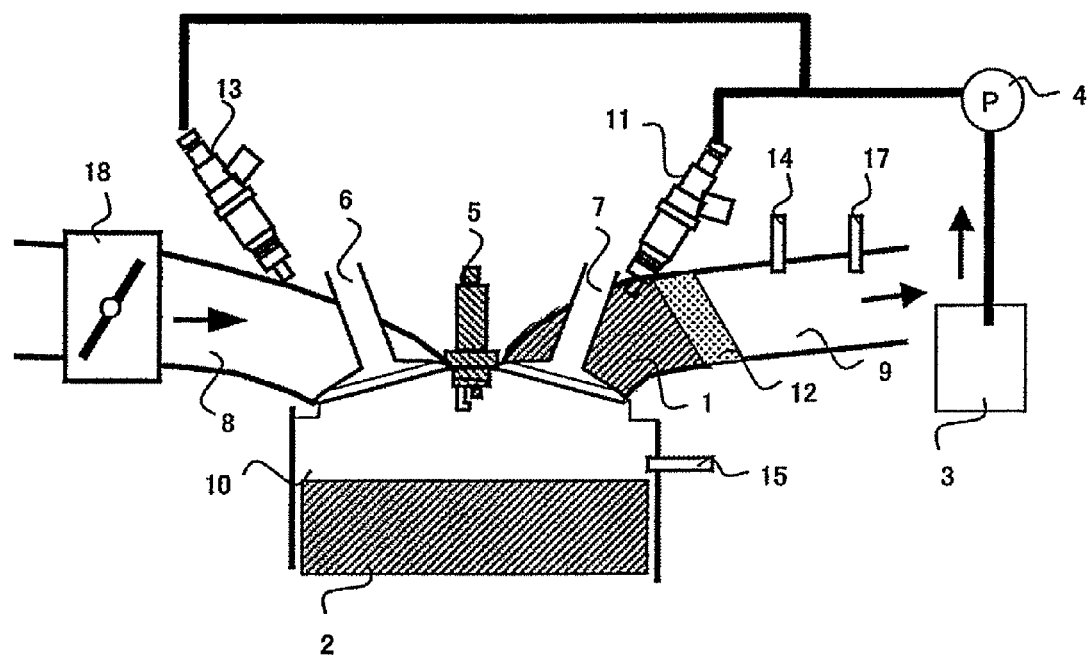
FIG. 1 is a first configuration diagram of an engine with a reformer.

FIG. 1 is a first configuration diagram of this system. A reformer 1 is installed in an engine head in the vicinity of an exhaust valve 7 of an exhaust pipe 9, or at the exhaust pipe immediately behind the engine head. A pre-reformed fuel 3 is supplied to the reformer 1 from a pre-reformed fuel tank 3 via a pre-reformed fuel supply adjustment unit 11. Here, the reformer 1 is installed adjacent to an engine combustion chamber via an exhaust valve 7 which also functions as a reformed fuel supply adjustment unit. According to this configuration, a combustion gas right after exhausted from an engine cylinder 10 is supplied to the reformer 1, resulting in supply of an engine exhaust heat at high temperature.

The exhaust valve 7 also functions as a reformed fuel supply adjustment unit to supply the reformed fuel into the engine cylinder 10. Normally, since an accidental fire, and decrease in engine efficiency are caused by supplying the exhaust gas into the engine by more than a predetermined amount, supplying the exhaust gas into the engine cylinder 10 by more than the predetermined amount will become a problem. In order to solve this problem, a backflow preventer 12 is installed at a downstream side of the exhaust gas of the reformer 1. This prevents the exhaust gas of the exhaust pipe at a downstream side of the reformer 1 from being supplied to the engine cylinder 10 when the reformed fuel is supplied from the exhaust valve 7 into the engine cylinder 10. For this reason, when the reformed fuel is supplied to the engine cylinder 10, the exhaust gas is supplied not more than the predetermined amount. An open/close valve can be used for the backflow preventer 12. At this time, when the pre-reformed fuel is supplied to the reformer 1, the open/close valve is closed so as to prevent the reformed fuel from being exhausted to a downstream.

A fuel supplying unit 13 to supply the pre-reformed fuel 3 is installed at the a suction pipe 8 of the engine so that the pre-reformed fuel can be supplied to the engine cylinder 10 without passing through the reformer 1. In addition, an oxygen concentration detecting unit 17 to detect an oxygen concentration in the exhaust gas is installed at the exhaust pipe 9 of the engine. An excess coefficient of the engine is controlled based on the oxygen concentration detected by the oxygen concentration detecting unit 17. An air flow adjustment unit 18 to adjust an air amount is installed at the suction pipe 8 of the engine. In addition, operations of the suction valve 6, the air flow adjustment unit 18, the exhaust valve 7, the pre-reformed fuel supply adjustment units 11 and 13, the open/close valve, and a pump 4, etc. are controlled by an electric controlling unit (not shown).

Figure 2:
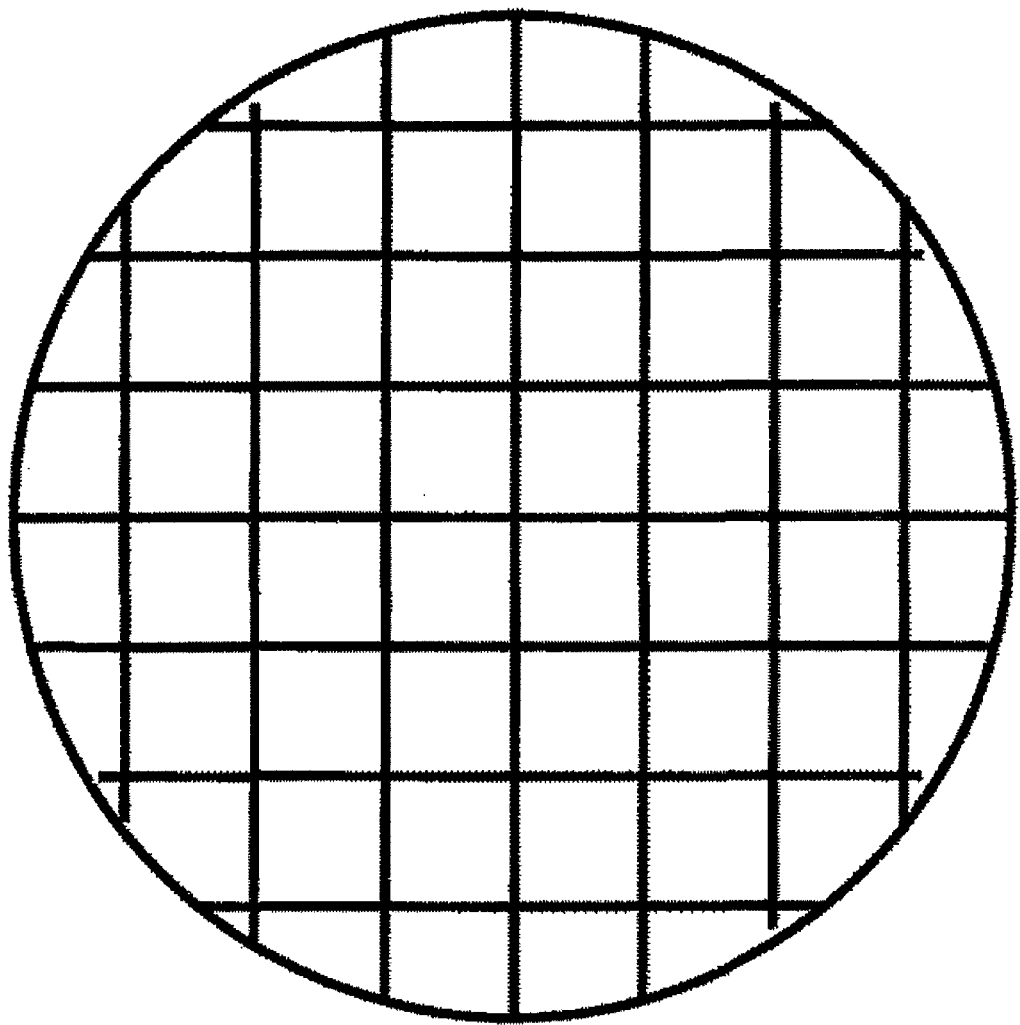
FIG. 2 is a structural drawing of the reformer.

Also, a pressure detecting unit 15 to detect a pressure in the engine cylinder 10 is installed. The pressure detecting unit 15 may be an axial torque sensor of the engine, or a detecting unit using an ion current, which can estimate the pressure in the engine cylinder 10. Also, a pressure sensor 14 to measure a pressure in the exhaust pipe is installed at a downstream side of the reformer 1 of the exhaust pipe 9. Since both of the exhaust gas and the pre-reformed fuel pass through the reformer 1, a contact surface area with the exhaust gas is increased by using a honeycomb structure as shown in FIG. 2. Also, a catalyst is supported by the exhaust gas contact surface so that a reforming reaction occurs at the exhaust gas contact surface. By using the above structure, a reaction flow path doubles as an exhaust gas flow path, and a water vapor in the exhaust gas of the engine becomes to be available in the reforming reaction. Also, the catalyst in the reformer 1 is a zeolitic catalyst. Also, the reformer 1 may increase the exhaust gas contact surface area by using a structure such as a porous structure, a fin structure, or a microspace, etc. Also, the catalyst of the reformer 1 is a noble metal including at least one or more elements of nickel, ruthenium, platinum, palladium, rhenium, chromium, and cobalt, and a carrier is a simple substance of any one of, or a mixture of, alumina, titania, silica, and zirconia. Also, the reformer 1 may increase the exhaust gas contact surface area by using the porous structure, the fin structure, or the microspace, etc.

By using the system configuration as shown in FIG. 1, the following effects can be obtained:

1. By using the water vapor in the exhaust gas for reforming, hydrogen in the water vapor can be used as the fuel,
2. A high temperature exhaust gas can be supplied to the reformer,
3. A high temperature EGR and the reformed fuel can be supplied into the engine cylinder,
4. A negative pressure during a suction stroke of the engine can be used for the reforming reaction,
5. There is no need to add a line for the reformed fuel, and
6. The reformed fuel never liquefies partially.

With respect to the effect 1, for example, assuming that the pre-reformed fuel is a gasoline, $C_8H_{18}$ (normal octane), which is one of components in the gasoline, can cause a water vapor reforming reaction as follows.

$$C_8H_{18} + 8H_2O \rightarrow 17H_2 + 8CO - 1303 \text{ kJ} \quad (1)$$

The above reforming reaction is an endothermic reaction, and hydrogen in the water vapor can be used as a fuel. Therefore, it is found that a heat value of the reformed fuel is larger than that of the pre-reformed fuel by 1303 kJ. Since the heat value of the pre-reformed fuel is 5075 kJ and that of the reformed fuel is 6378 kJ, the heat value of the reformed fuel is more improved than that of the pre-reformed fuel by 25.7%. That is, it means that the reforming reaction improves a heat efficiency by 25.7% with reference to $C_8H_{18}$.

Figure 3:
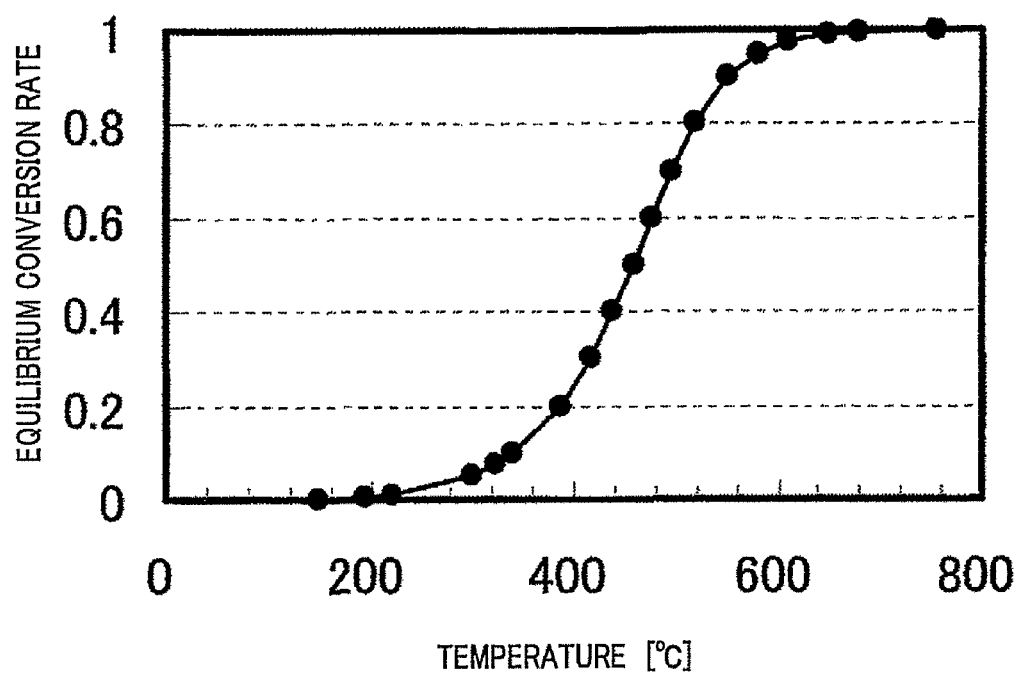
FIG. 3 is a graph showing a relationship between an equilibrium conversion rate in a reforming reaction and temperature.
Figure 4:
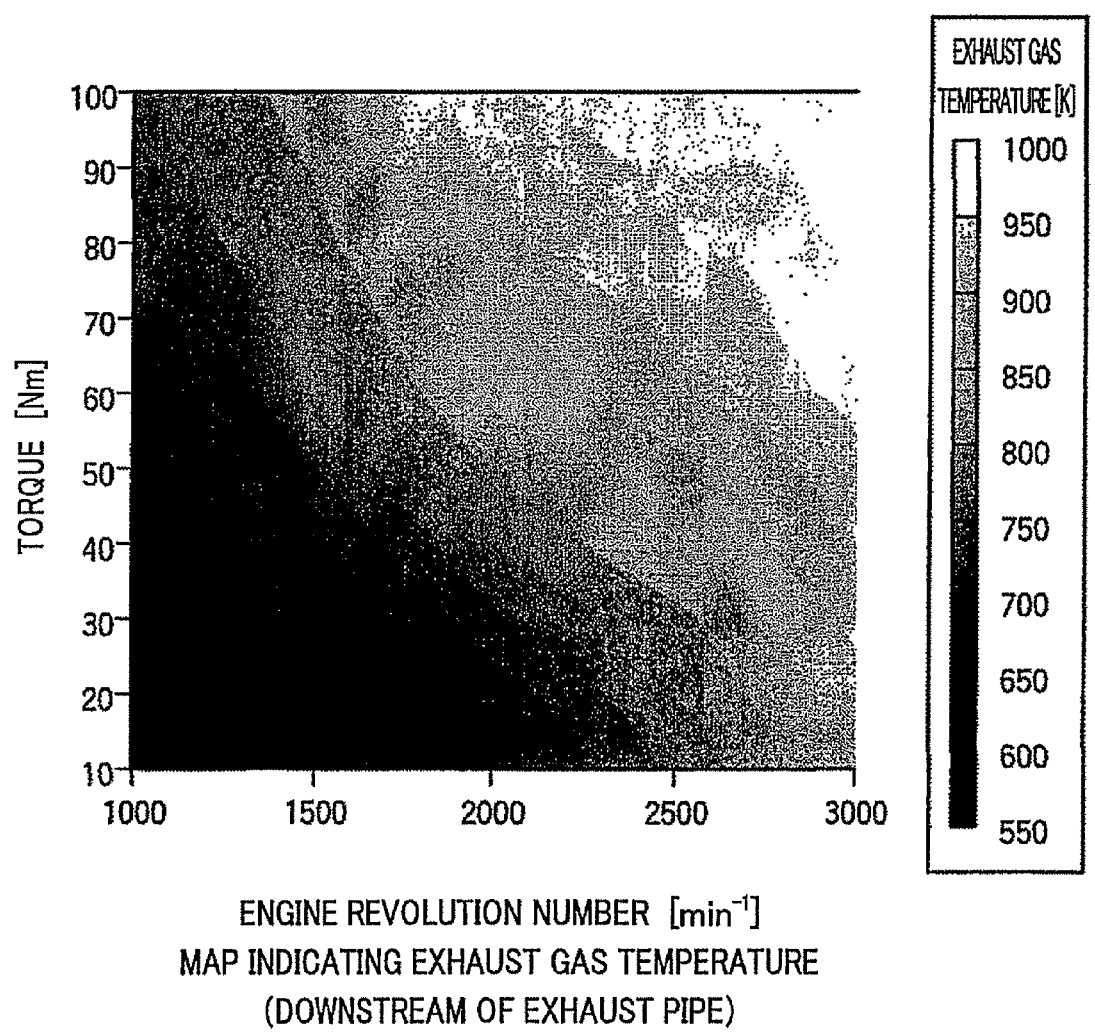
FIG. 4 is a map indicating an exhaust gas temperature to an engine revolution number and an engine torque at downstream of the exhaust pipe.
Figure 5:
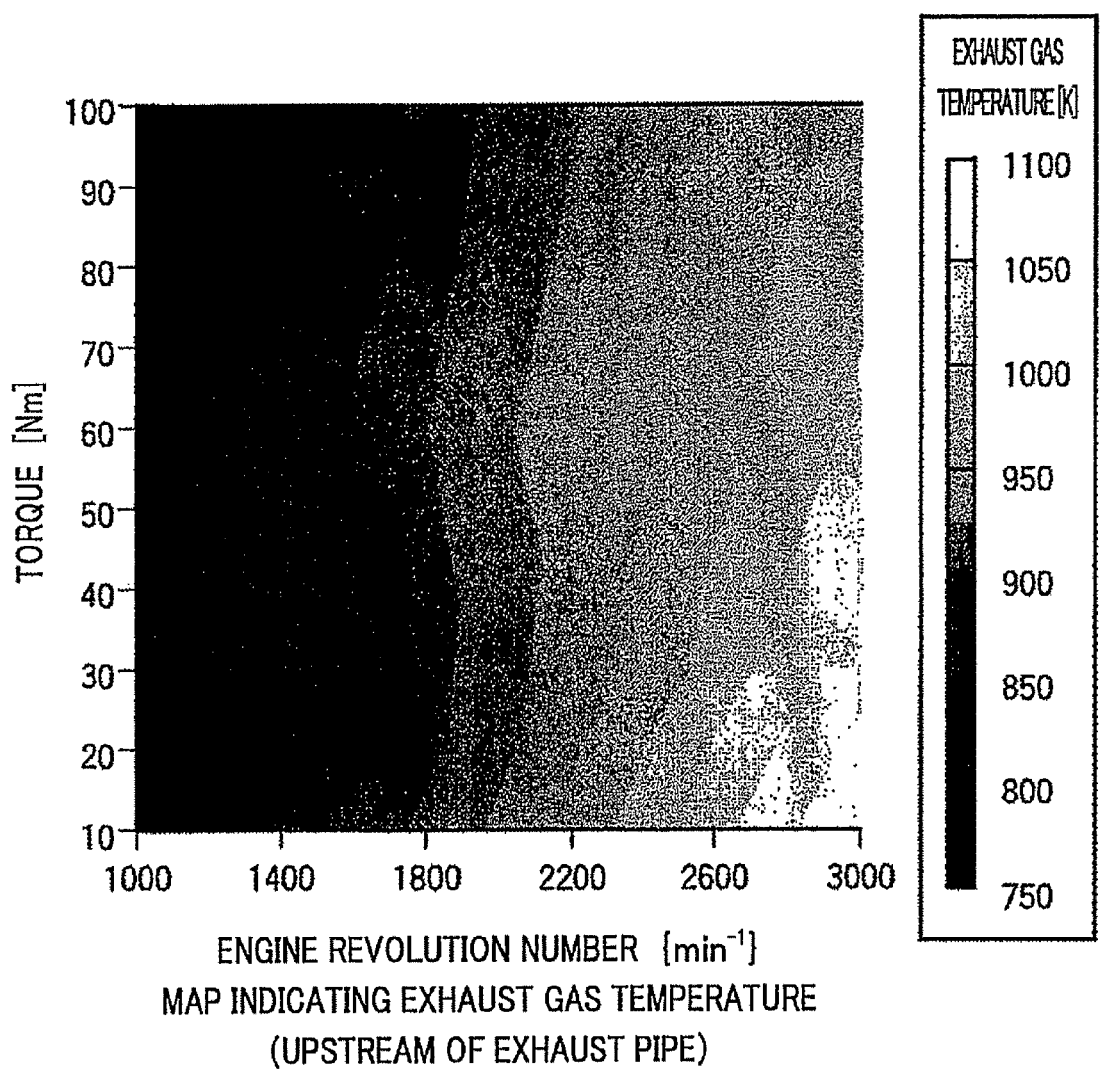
FIG. 5 is a map indicating an exhaust gas temperature to an engine revolution number and an engine torque at upstream of the exhaust pipe.

With respect to the effect 2, FIG. 3 shows a relationship between an equilibrium temperature of the reforming reaction (1) and a conversion rate. According to FIG. 3, it is found that the higher the reforming temperature, the higher the reforming efficiency. FIGS. 4 and 5 show exhaust gas temperatures at a gathering portion of exhaust manifolds on the downstream side of the exhaust pipe and at a position immediately behind an engine outlet, which are mapped using an engine revolution number and an engine torque in order to compare to each other, respectively. According to FIGS. 4 and 5, it is found that the nearer to the engine, the higher the exhaust gas temperature, and that a change in the exhaust gas temperature depending on an operating condition of the engine is small. From the above, by installing the reformer 1 in the exhaust pipe in the vicinity of the exhaust valve of the engine or in the engine head as shown in FIG. 1, an exhaust gas having higher temperature can be supplied to the reformer 1, and the reforming efficiency of the reformer 1 can be improved. Also, since the exhaust gas having higher temperature can be supplied to the reformer 1, various fuels such as the gasoline, alcoholic fuels such as a methanol and an ethanol, etc., an alicyclic hydrocarbon, and an aromatic hydrocarbon, etc., can be reformed, and various kind of fuel can be used.

Figure 6:
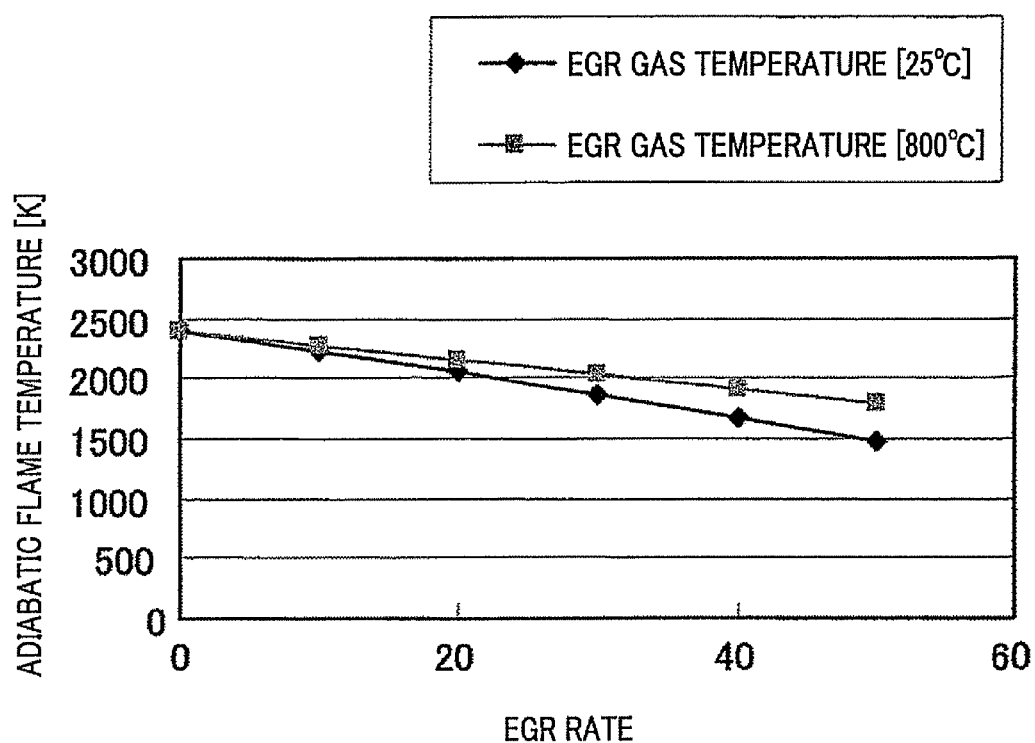
FIG. 6 is a graph showing a relationship between an EGR rate and an adiabatic flame temperature at the time when an excess coefficient of a mixture supplied into an engine cylinder is equal to 1.
Figure 7:
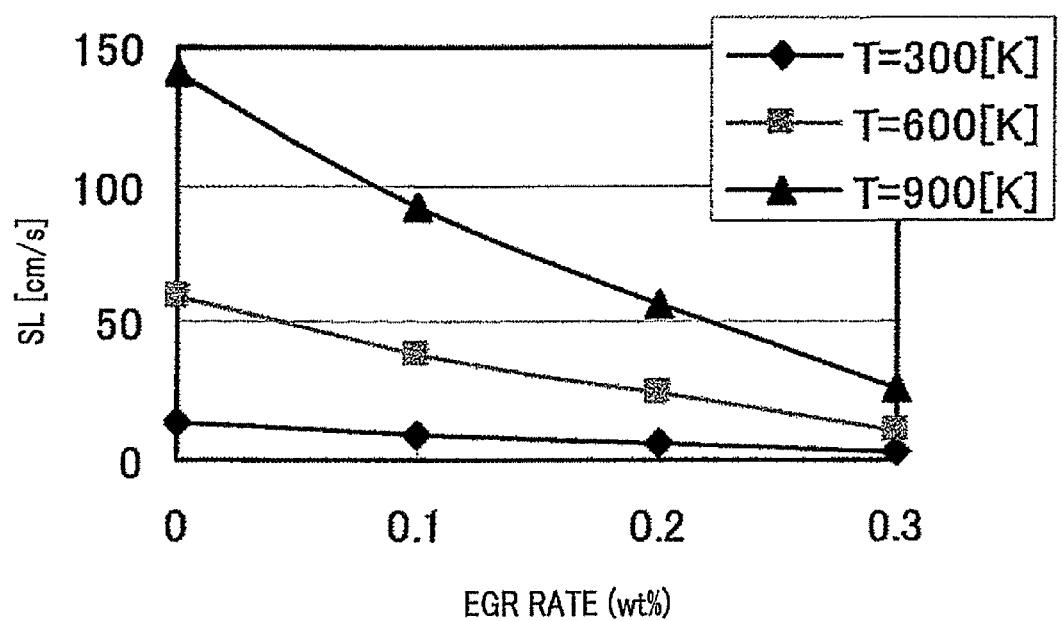
FIG. 7 is a graph showing a relationship between an EGR rate and a laminar flow combustion rate in the mixture in the engine cylinder.

With respect to the effect 3, an explanation will be given. By using the configuration shown in FIG. 1, the reformed fuel can be supplied from the exhaust valve 7. At that time, since the water vapor in the exhaust gas is used for reforming, a high temperature EGR gas is supplied to the engine cylinder 10 together with the reformed fuel. FIG. 6 shows a relationship between an EGR rate and an adiabatic flame temperature at the time when an excess coefficient of a mixture supplied into the engine cylinder 10 is equal to 1. The EGR gas temperatures are compared at 25° C. and 800° C. According to FIG. 6, it is found that when the EGR rate is increased, an inert gas is increased and the adiabatic flame temperature is lowered, and that the higher the EGR gas temperature is, the more lowering of the adiabatic flame temperature is suppressed. That is, it means that lowering of the exhaust gas temperature of the engine associated with increasing in the EGR rate can be suppressed. When the water vapor in the exhaust gas is used for reforming, the EGR gas is mixed with the reformed fuel, However, by using the configuration shown in FIG. 1, the EGR gas temperature can be raised, lowering of the exhaust gas temperature can be suppressed, and the reforming efficiency at the time when the EGR gas is supplied can be improved. Next, FIG. 7 shows an EGR rate of the mixture in the engine cylinder 10 in the horizontal axis, and a laminar flow combustion rate (SL) in the vertical axis. At that time, the mixture temperatures are compared. Since the combustion rate affects a degree of constant volume of the engine, it is an important factor to improve the heat efficiency. FIG. 7 shows that the lower the EGR rate is and the higher the mixture temperature is, the higher the laminar flow combustion rate is. That is, even if the EGR rate is high, the combustion rate can be improved by raising the mixture temperature. Since the high temperature EGR gas can be supplied to the engine by using the configuration shown in FIG. 1 and the mixture temperature can be raised compared to the normal temperatures of the EGR gas, the combustion rate can be improved and the degree of constant volume can be improved.

Figure 8:
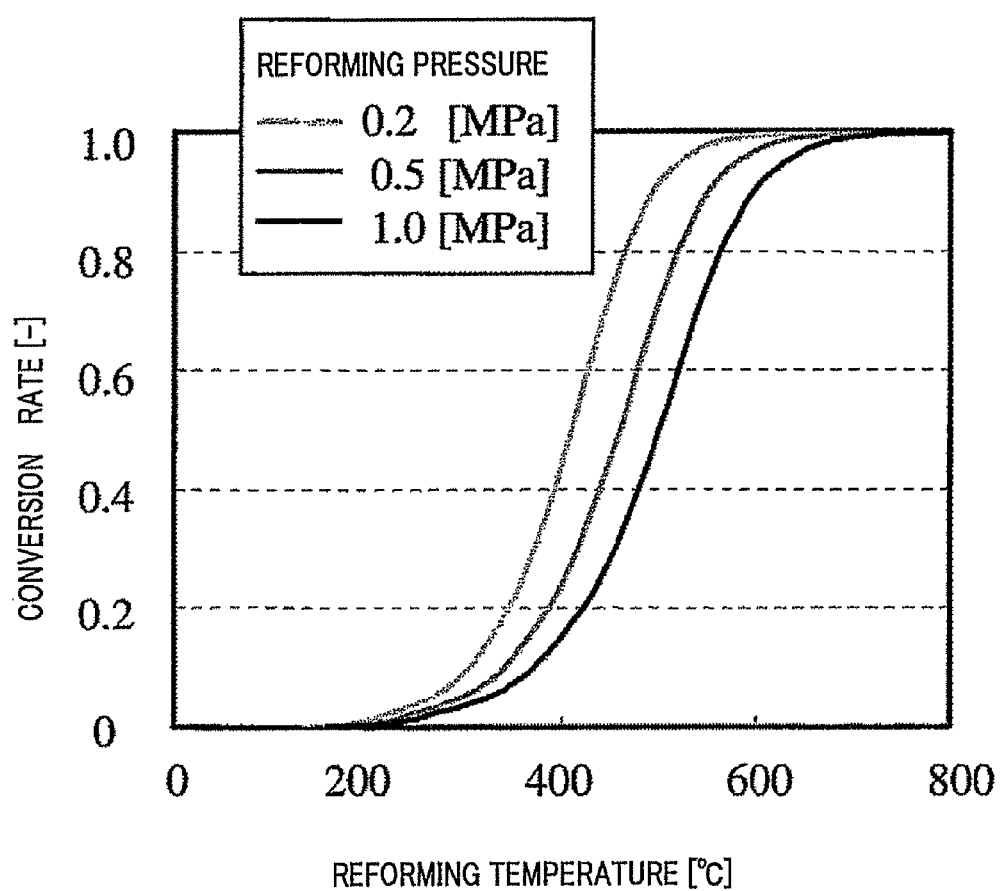
FIG. 8 is a graph showing a relationship between an equilibrium conversion rate and the temperature at the time when a pressure is changed in the reforming reaction.

With respect to the effect 4, FIG. 8 shows the relationship between the equilibrium temperature and the conversion rate at the time of the reforming reaction of the chemical formula (1) by comparing reforming reaction pressures. In the reaction represented by the chemical formula (1) in which number of molecules increases after reforming, the lower the reforming reaction pressure is, the higher the conversion rate is. By using the configuration shown in FIG. 1, since a negative pressure during a suction stroke of the engine can be used for the reforming reaction, the reforming efficiency is increased, the amount of recovered waste heat is increased, and the heat efficiency of the engine is increased With respect to the effects 5 and 6, in such a configuration disclosed in the patent document 1, since the reformed fuel is supplied from the reformer 1 to the suction pipe 8, it is necessary to newly install a pipe used for the reformed fuel. Also, by installing the pipe used for the reformed fuel, the gasoline which was not reformed in the reformed fuel is cooled at the midway of the pipe and may liquefy partially. As opposed to the above, by using the configuration shown in FIG. 1, since the reformed fuel is supplied from the exhaust pipe 9 of the engine to the engine cylinder 10, the pipe for the reformed fuel is not needed. Also, since the reformed fuel is supplied into the engine cylinder before the reformed fuel is cooled, the problem of partial liquefaction of non-reformed gasoline does not arise.

Figure 9:
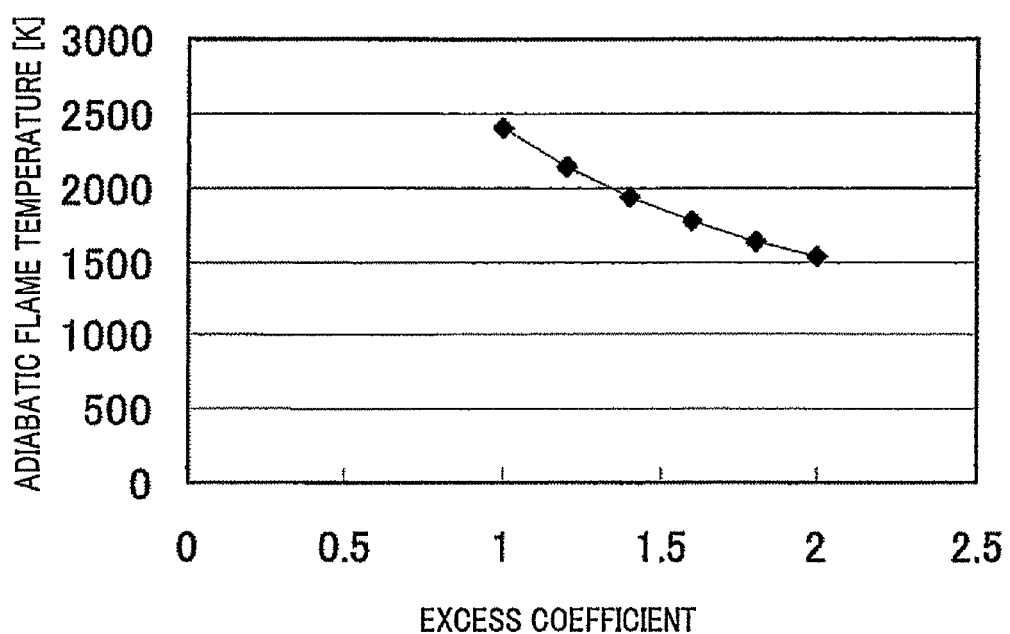
FIG. 9 is a graph showing a relationship between an excess coefficient and an adiabatic flame temperature.
Figure 10:
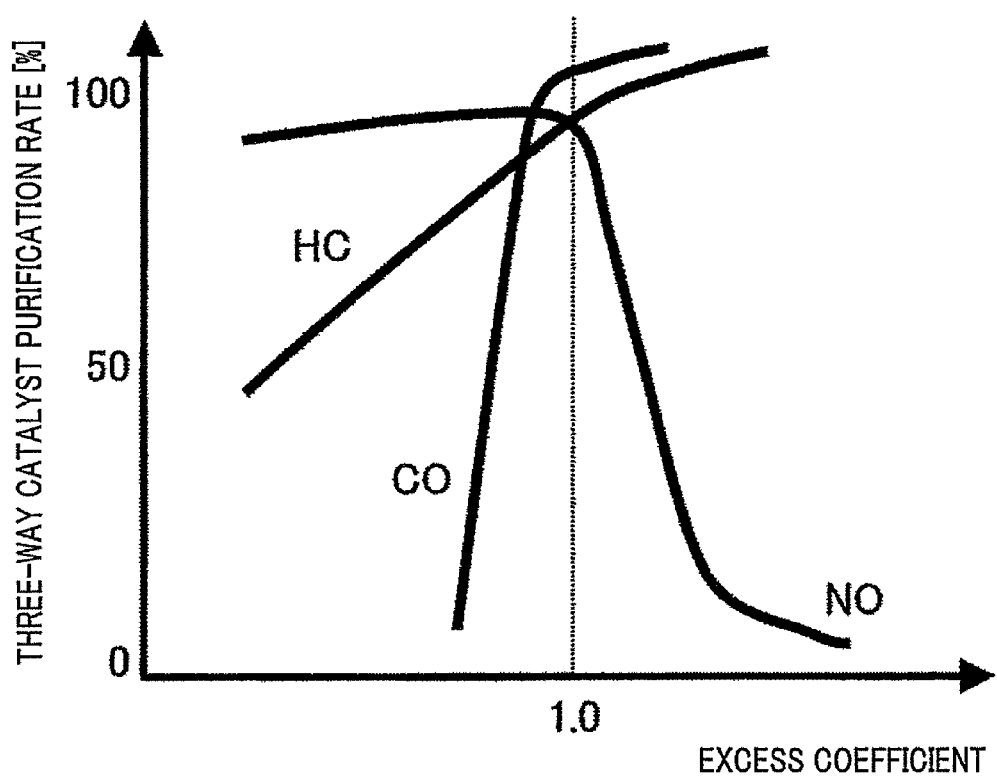
FIG. 10 is a graph showing a relationship between an excess coefficient and a three-way catalyst purification rate.
Figure 11:
FIG. 11 is a graph showing a relationship between an excess coefficient and a laminar flow combustion rate.

Next, a controlling method in the first configuration diagram will be explained. In a first configuration, the engine is controlled so that the engine is operated near the excess coefficient of about 1. FIG. 9 shows a relationship between the excess coefficient and the adiabatic flame temperature. As shown in FIG. 9, it is found that the closer the excess coefficient approaches to 1, the higher the adiabatic flame temperature is. That is, FIG. 9 shows that the exhaust gas temperature is raised. For this reason, the reforming efficiency in the reformer 1 is improved, and the heat efficiency is improved. Next, FIG. 10 shows a relationship between the excess coefficient and a purification rate of a three-way catalyst. According to FIG. 10, in view of the purification of the exhaust gas, it is found that the operation on condition that the excess coefficient is about 1 is optimal. FIG. 11 shows a relationship between a laminar flow combustion rate and the excess coefficient. According to FIG. 11, the laminar flow combustion rate is maximized at a point where the excess coefficient is slightly lower than 1. Also, when oxygen exists in a reforming reaction chamber of the reformer 1, the pre-reformed fuel is oxidized at the time of reforming, thereby generating heat. Therefore, an endothermic value at the time of reforming is decreased, resulting in lowering of the heat efficiency. For this reason, the operation is performed on condition that the excess coefficient is equal to or less than 1 so that oxygen does not exist in the exhaust gas. For these reasons, in the first configuration, the operation on condition that the excess coefficient is equal to 1 is optimal. In order to realize this condition, at least one of controlling an air flow adjustment unit 18 installed in the suction pipe 8, controlling an amount of the pre-reformed fuel supplied to the suction pipe 8, and controlling an amount of the pre-reformed fuel supplied to the reformer 1 is performed so that an oxygen concentration in the exhaust pipe 9 is within a predetermined range.

Figure 12:
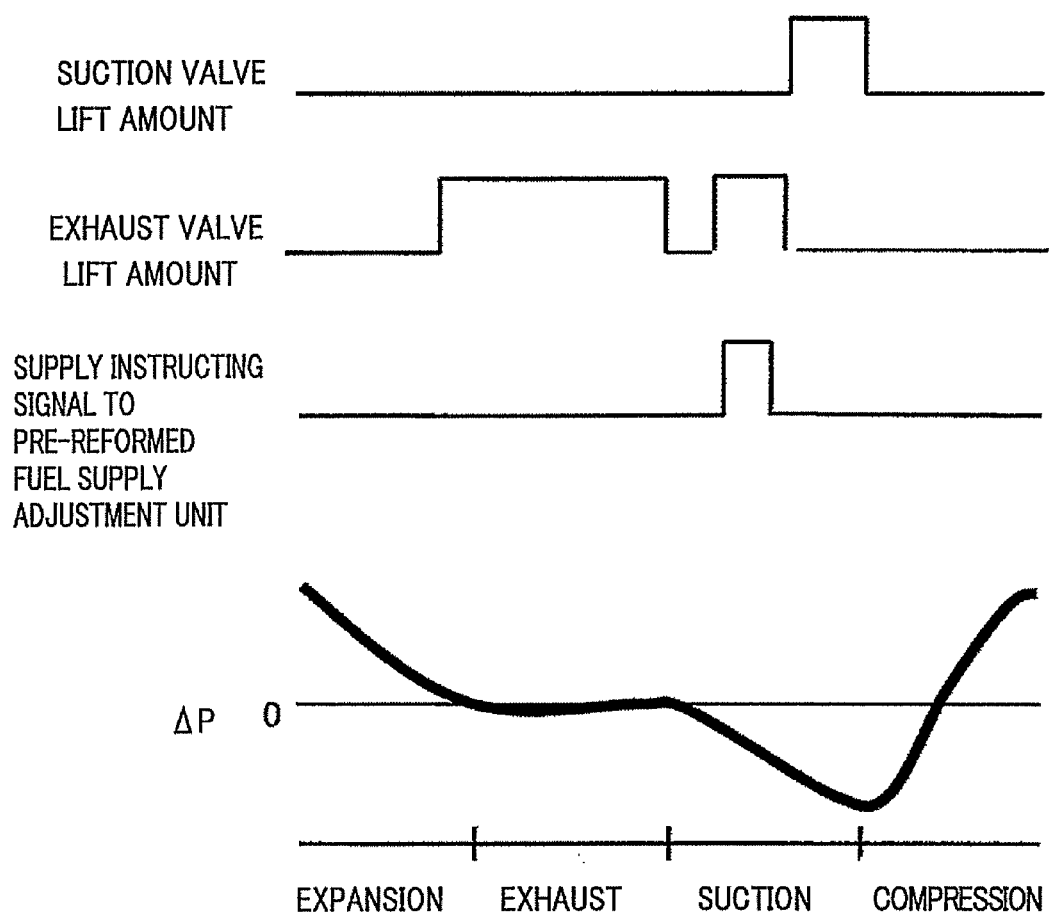
FIG. 12 is a diagram showing histories of a lift amount of an exhaust valve, a control signal to a pre-reformed fuel supply adjustment unit, and a differential pressure between a pressure in an engine cylinder and an exhaust pipe pressure at each stroke of the engine of the first configuration diagram.

Next, an open/close timing of the exhaust valve and a supply timing of the pre-reformed fuel will be explained. FIG. 12 shows histories of a lift amount of the exhaust valve 7, a control signal to the pre-reformed fuel supply adjustment unit 11, and $\Delta P$ at each stroke of the engine. $\Delta P$ is defined as described below.

$\Delta P$=pressure in engine cylinder–exhaust pipe pressure

During an exhaust gas stroke of the engine, the exhaust valve 7 is lifted, an exhaust gas in the engine cylinder 10 is exhausted to the exhaust pipe 9, the exhaust gas is supplied to the reformer 1, and the reformer 1 is warmed. After that, during a suction stroke of the engine, when the $\Delta P$ becomes a negative pressure, the exhaust valve 7 is opened again, and a supply instructing signal is input to the pre-reformed fuel supply adjustment unit 11. By controlling as described above, since $\Delta P$ is the negative pressure, the pre-reformed fuel is supplied from the pre-reformed fuel supply adjustment unit 11 to the reformer 1, the pre-reformed fuel is reformed in the reformer 1, and the reformed fuel is supplied to the engine cylinder 10 via the exhaust valve 7 together with the exhaust gas. At that time, since there is a time lag in supplying of the reformed fuel from the reformer 1 to the engine cylinder 10, supplying of the pre-reformed fuel from the pre-reformed fuel supply adjustment unit 11 to the reformer 1 is stopped during a suction stroke before the exhaust valve 7 is closed. Also, the suction valve 6 is opened after the exhaust valve 7 is closed. This is because the reforming reaction can be occurred in the reformer 1 at low pressure by opening only the exhaust valve 7 so as to supply the reformed fuel, and the reforming efficiency is improved.

Next, an operating method without supplying the pre-reformed fuel to the reformer 1 will be explained. Since the reforming temperature in the reformer 1 is low at the time of starting or warming-up of the engine, the reforming efficiency is lowered as shown in FIG. 3. For this reason, the pre-reformed fuel is prevented from being supplied to the reformer 1, and the pre-reformed fuel can be supplied to the engine cylinder 10 by the fuel supplying unit 13 without passing through the reformer 1. At the same time, since the exhaust valve 7 is controlled so as not to open at the suction stroke, the EGR gas is prevented from being mixed into the engine. By operating as described above, warming-up time of the reformer 1 is shortened, thereby enabling an operation with high reforming efficiency.

Figure 13:
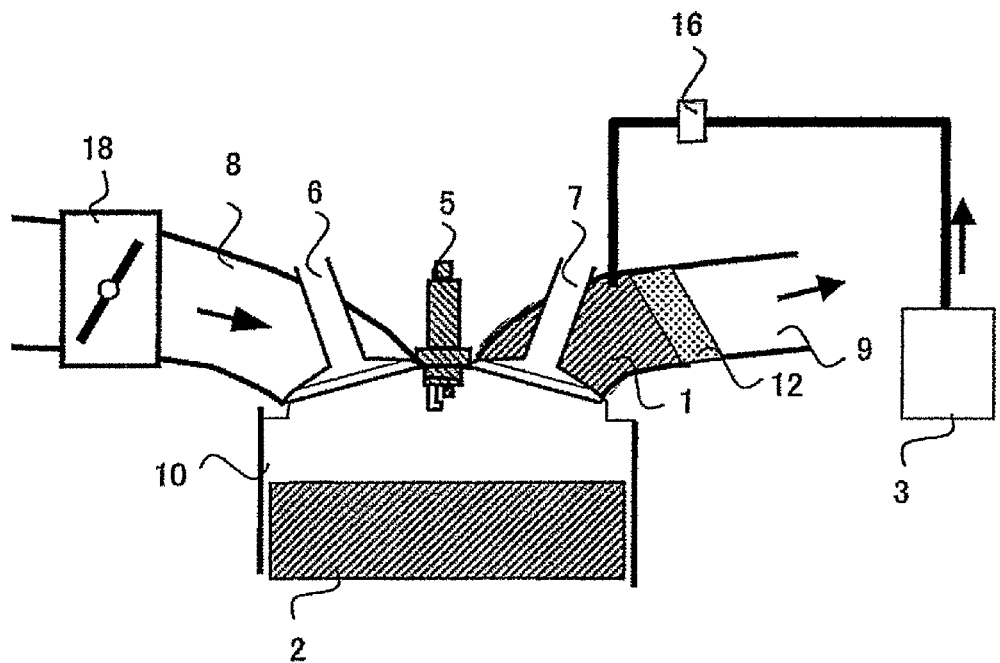
FIG. 13 is a second configuration diagram of an engine with a reformer.

Next, FIG. 13 shows a second configuration. An adjustment valve 16, which is adjusted to be opened at a differential pressure equal to or greater than a predetermined differential pressure, is installed at a pipe connecting the pre-reformed fuel tank 3 to the reformer 1. Since a backflow preventer 12 of the exhaust gas makes the pressure in the reformer 1 to be negative during the suction stroke of the engine, a differential pressure occurs between the pre-reformed fuel tank 3 and the reformer 1. This differential pressure causes the pre-reformed fuel to be supplied to the reformer 1. At this time, the adjustment valve 16 prevents the pre-reformed fuel from being supplied to the reformer 1 after the exhaust valve 7 is closed. Also, the air amount supplied to the engine cylinder 10 is adjusted by the air flow adjustment unit 18. The air flow adjustment unit 18 may be a valve mechanically adjusting the air flow.

Figure 14:
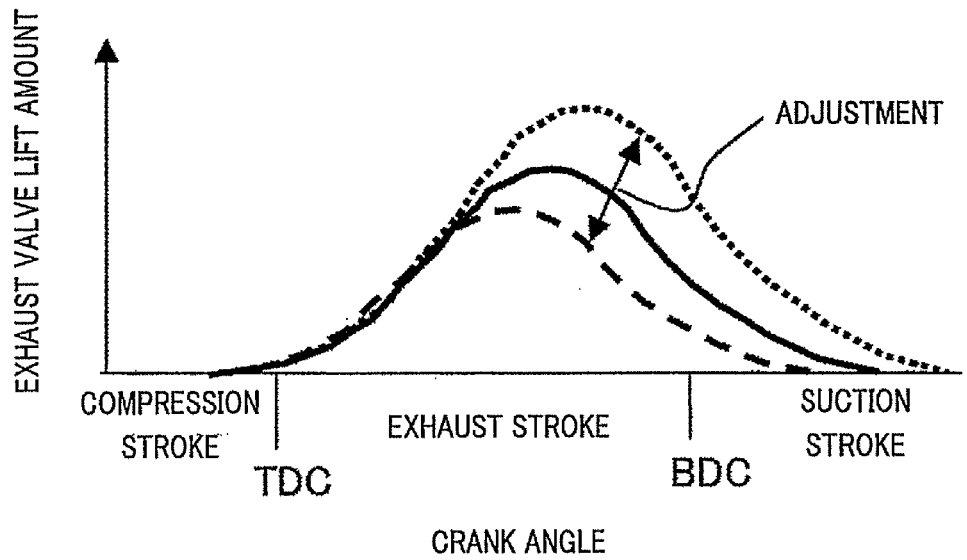
FIG. 14 is a time series diagram showing change in an exhaust valve lift amount at each stroke of an engine.

Compared to the first configuration, a second configuration does not need the pre-reformed fuel supply adjustment unit or the electric controlling unit, and the pre-reformed fuel can be supplied to the reformer 1 mechanically. Therefore, the number of parts and cost of the system are reduced, and the reformed fuel can be supplied from the exhaust valve 7 to the engine cylinder 10 reliably. In the second configuration, when a ratio of a supply amount of the pre-reformed fuel supplied to the engine cylinder 10 to a suction air amount is adjusted, by adjusting the open/close timing or the open/close lift amount in addition to the supply amount of the pre-reformed fuel and a throttle opening of the exhaust valve 7, a reformed fuel supply amount to the air amount supplied to the engine cylinder 10 becomes to be adjustable. FIG. 14 shows a method for adjusting the open/close lift amount of the exhaust valve 7. By changing the lift amount and the open/close timing of the exhaust valve 7 continuously or stepwise as described above, the supply amount of the pre-reformed fuel can be adjusted. Also, a reformed fuel supply amount supplied into the engine cylinder 10 may be adjusted by adjusting the adjustment valve 16 in order to adjust a pre-reformed fuel supply amount supplied to the reformer 1. Also, in the second configuration, when the temperature of the reformer 1 is lower than a predetermined temperature (e.g., at the time of starting of the engine, or warming-up of the reformer 1), or when the reformer 1 is out of order, a pipe supplying the pre-reformed fuel to the suction pipe 8 without passing through the reformer 1 may be provided. Here, for example, the predetermined temperature is a temperature at which a dopant ratio is equal to or less than 10% when the fuel is reformed in the reformer 1. As methods for detecting a temperature, a method for directly detecting the temperature in the reformer 1, or a method for detecting the exhaust gas temperature to estimate the temperature in the reformer 1 may be used.

Figure 15:
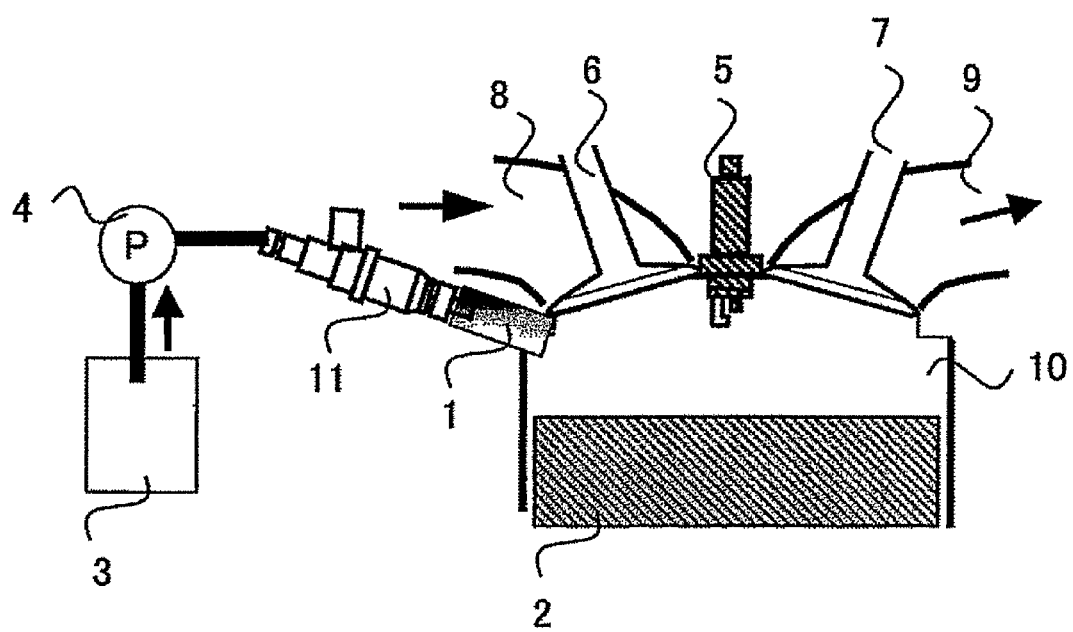
FIG. 15 is a third configuration diagram of an engine with a reformer.

Next, FIG. 15 shows a third configuration. In the third configuration, the pre-reformed fuel supply adjustment unit 11 supplies the pre-reformed fuel to the reformer 1, and the reformer 1 is provided in the engine cylinder 10. For example, the pre-reformed fuel supply adjustment unit 11 may be a gasoline direct-injector, and the reformer 1 may be provided in the gasoline direct-injector.

Figure 16:
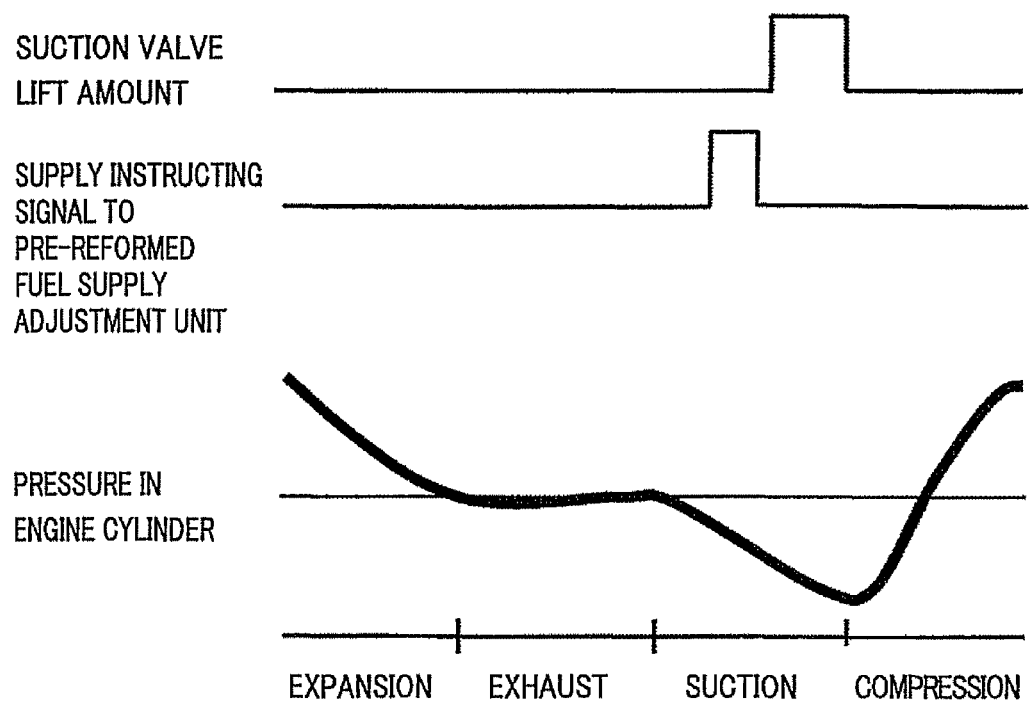
FIG. 16 is a time series diagram showing change in a suction valve lift amount at each stroke of an engine of the third configuration diagram.

Compared to the first configuration, by using the third configuration, there is no need to modify the engine drastically, and the number of parts can be reduced. Also, since the reformer 1 is provided in the engine cylinder 10, the reformed fuel can surely be supplied to the engine cylinder 10. Specifically, in the controlling method, since the reaction pressure at the time of reforming can be lowered by supplying the pre-reformed fuel to the reformer 1 during the suction stroke, the reforming efficiency is improved (see FIG. 8). Further, as shown in FIG. 16, by opening the suction valve 6 after the pre-reformed fuel is supplied to the reformer 1 by the pre-reformed fuel supply adjustment unit 11 during the suction stroke, the reforming reaction pressure in the reformer 1 can be lowered, and the reforming efficiency is improved.

EXPLANATION OF REFERENCE SYMBOLS

1 reformer
2 piston
3 pre-reformed fuel tank
4 pre-reformed fuel pump
5 spark plug
6 suction valve
7 exhaust valve
8 suction pipe
9 exhaust pipe
10 engine cylinder
11 pre-reformed fuel supply adjustment unit
12 backflow preventer
13 pre-reformed fuel supply adjustment unit
14, 15 pressure sensor
16 adjustment valve
17 oxygen concentration detecting unit
18 air flow adjustment unit

What is claimed is:

1. An engine system comprising:
    an engine;
    a fuel tank to store a pre-reformed fuel; and
    a reformer to reform the pre-reformed fuel,
    wherein a reformed fuel which is reformed by the reformer is supplied to a cylinder of the engine, the reformer is attached to an exhaust pipe of the engine, the reformed fuel is supplied to the cylinder of the engine from an exhaust valve of the engine, an exhaust gas backflow preventer is installed in the exhaust pipe at a downstream side of the reformer, and an adjustment valve, which is adjusted to be mechanically opened at a differential pressure equal to or more than a predetermined differential pressure, is installed at a pipe to connect the fuel tank to the reformer,
    wherein the adjustment valve is configured to be mechanically opened under a negative pressure generated in the reformer by a suction stroke of the cylinder of the engine to supply the pre-reformed fuel from the fuel tank to the reformer.

2. The engine system of claim 1, wherein
    a supply amount of the pre-reformed fuel to the reformer, and a supply amount of the reformed fuel to the engine are controlled by adjusting an open/close timing or an open/close lift amount of the exhaust valve of the engine.

3. The engine system of claim 1, wherein
a supply amount of the reformed fuel to the engine is controlled by adjusting a supply amount of the pre-reformed fuel to the reformer using the adjustment valve.

4. The engine system of claim 1,
wherein the engine further comprises a suction pipe including an air flow adjustment unit installed therein,
wherein the air flow adjustment unit is configured to control an amount of air to be supplied to the engine for an air excess coefficient to be 1 or less.

5. The engine system of claim 1, wherein the pipe which connects the fuel tank to the reformer is connected to the exhaust pipe of the engine.

6. The engine system of claim 5, wherein the pipe is connected to the exhaust pipe at an upstream side of the exhaust gas backflow preventer.

* * * * *